Figure 1:
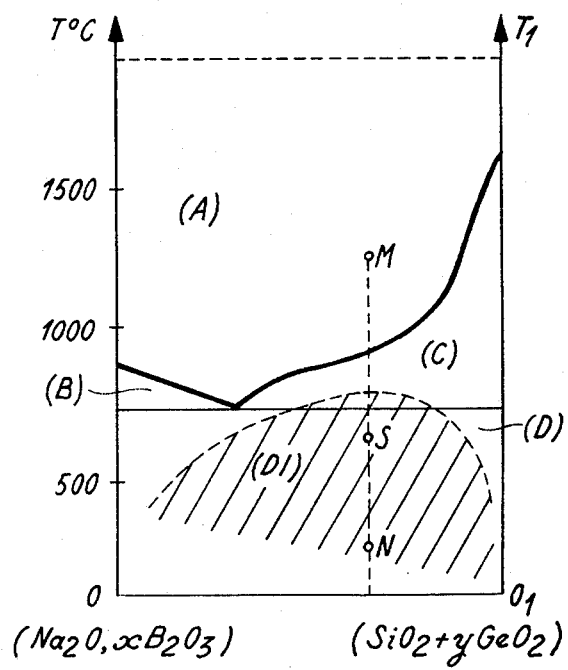

United States Patent [19]

de Panafieu et al.

[11] 4,249,924
[45] Feb. 10, 1981

[54] PROCESS FOR THE PRODUCTION OF GRADED INDEX OPTICAL FIBRES

[75] Inventors: Arnaud de Panafieu; Christiane Baylac; Yves Nemaud; Marc Turpin; Michel Faure, all of Paris, France

[73] Assignee: Thomson-CSF, Paris, France

[21] Appl. No.: 42,785

[22] Filed: May 29, 1979

[30] Foreign Application Priority Data

May 30, 1978 [FR] France ............................. 78 16035

[51] Int. Cl.³ ...................... C03B 37/00; C03C 15/00; C03B 32/00
[52] U.S. Cl. .......................................... 65/2; 65/3 A; 65/31; 65/33
[58] Field of Search .......................... 65/2, 3 A, 31, 33

[56] References Cited

U.S. PATENT DOCUMENTS

| | | | |
|---|---|---|---|
| 4,097,258 | 6/1978 | Horikawa et al. | 65/31 |
| 4,165,222 | 8/1979 | Panafieu et al. | 65/2 |

Primary Examiner—Robert L. Lindsay, Jr.
Attorney, Agent, or Firm—Oblon, Fisher, Spivak, McClelland & Maier

[57] ABSTRACT

A process for the manufacture of a glass blank in the form of a rod from which the optical fibre is drawn, said blank being produced starting from a molten bath of glass. A first stage of the process comprises melting a mixture of starting materials having a higher impurity content ($<10^{-4}$) in the form of so-called transition metals then the final blank ($<10^{-7}$). A second stage consists in inducing separation into two solid phases (a hard phase rich in silica and a soft phase poor in silica) by drawing the blank from the bath of molten glass and by subsequently subjecting it to a thermal annealing treatment. This is followed by deep etching and by peripheral etching to eliminate the soft phase and its impurities to different extents as a function of depth, which creates a radial refractive index gradient and an optical cladding.

19 Claims, 3 Drawing Figures

PROCESS FOR THE PRODUCTION OF GRADED INDEX OPTICAL FIBRES

This invention relates to low-attenuation photo-conductive glass fibres and, more particularly, to fibres having a radial refractive index gradient of the type used in particular in optical telecommunications.

So-called step-index optical fibres are already known, consisting of a cylindrical core of glass surrounded by an outer cladding, generally of glass, which has a lower refractive index than the core. The light is propagated within the core, remaining trapped in the fibre as a result of total reflection at the interface between the core and the cladding.

So-called GRADED INDEX optical fibres are also known in which the refractive index of the core decreases from the axis to the core-cladding interface in accordance with a pseudo-parabolic law. A refractive index profile such as this one minimizes the temporal broadening of a light pulse travelling along the fibre and therefore maximizes the band pass of the fibre. In practice, it is possible to accept a deviation from the pseudo-parabolic law in the central region of the core without the band pass being detrimentally affected to any significant extent.

Processes for producing low-attenuation optical fibres having a wide band pass have to solve two main problems:

First problem: Producing highly pure glasses containing a proportion of less than $10^{-7}$ of certain impurities, such as certain transition metals, which absorb light in the near-infrared region to a considerable extent.

Second problem: Obtaining the required radial decrease in the refractive index in the core by radially varying the chemical composition of the glass in a controlled manner.

In order in practice to obtain an optical fibre which satisfies the above-mentioned requirements in regard to purity and radial gradient, one method consists in forming a rod of glass, also known as a blank, which satisfies these requirements. The optical fibre is then directly obtained from the rod by hot drawing (fibre-drawing). If any pollution during the fibre-drawing operation is avoided, the purity of the fibre is equivalent to that of the rod. Similarly, the radial gradient of the fibre reproducts the radial gradient of the rod.

Conventional methods for producing rods which satisfy the above-mentioned requirements are attended by certain disadvantages.

In the case of the methods using highly pure starting materials (impurity content less than $10^{-7}$), it is their high cost which is the main disadvantage and the possible contamination of the glass during its formation.

In other methods using less pure starting materials (impurity content $10^{-6}$ to $10^{-4}$), a rod is produced from these starting materials, after which the glass of this rod is subjected to a purifying treatment comprising several steps, including separation into two interconnected and continuous phases, elimination of the phase which has collected most of the impurities and consolidation (closing of the pores) of the porous glass thus obtained. One disadvantage of processes such as these arises out of the fact that, in order to obtain a radial gradient, a doping element which modifies the refractive index has to be added to the pores. The addition of a doping agent such as this involves an additional step which complicates the process. In addition, the doping agent remains included in the glass on completion of the treatment and, for this reason, has to be extremely pure (impurity content less than $10^{-7}$) which is all the more expensive in view of the relatively large quantities (on the order of 5% or more) of doping agent used in this technology.

U.S. Patent Applications Ser. No 842,218 and Japanese Patent Application No 33443/1978 describe a process which enables purified preforms having a radial refractive index gradient to be directly obtained by the above-mentioned purification steps without any need for a doping element to be subsequently added.

This process comprises:

a first stage consisting in mixing starting materials capable of entering into a glass composition showing the phenomenon of separation into two solid interconnected and continuous phases of different compositions, said starting materials comprising oxides of silicon, boron and sodium (or oxides of silicon, boron, sodium and potassium) and complementary materials comprising at least one of the oxides of the following elements: germanium, titanium, phosphorous and aluminium, said starting and complementary materials having an impurity level of under $10^{-5}$ calculated from the molar proportions of the transition metals, said first stage subsequently comprising the steps of:

I. Mixing said oxides; followed by melting said oxides into a molten bath;

II. Drawing said glass blank from said molten bath through a cooling system having a decreasing temperature gradient; followed by thermally annealing said glass blank; and III. Leaching said glass blank to eliminate most of the impurities; followed by heat consolidating said glass blank.

However, the fibres obtained by drawing from these blanks have two disadvantages:

although the refractive index decreases continuously from the axis to the periphery, the fibre only has a core with an index gradient, but no optical cladding. The absence of an optical cladding is a source of losses of light because the light rays travelling through the fibre come into contact with the surface of the fibre where they are partly scattered by the imperfections (dust, microcracks, etc . . . ) present at the glass/air interface;

the radial variation in the refractive index is not exactly that (pseudo-parabolic) which maximizes the band pass of the fibre.

The object of the present invention is in particular to obviate these two disadvantages. The invention enables preforms having a core where the refractive index decreases radially in accordance with a pseudo-parabolic law and an external cladding having a lower refractive index than the core to be obtained by the above-mentioned purification steps without any need for a doping agent to be subsequently added.

In the process according to the invention, a glass is produced in a first stage from starting materials which may contain a certain proportion of impurities (less than $1.10^{-4}$). These starting materials are selected in such a way as to promote separation of the glass into two phases during the subsequent treatments. The hard phase which is intended to remain in the final glass is rich in silica. The soft phase which is intended to be eliminated is poor in silica and contains most of the impurities. Some of these starting materials constitute a doping agent, i.e. a substance which, like germanium oxide, is capable of increasing the refractive index of the glass.

In a second stage, a blank is drawn from the molten glass and two interconnected vitreous phases of different chemical compositions are formed on a microscopic scale during the shaping of this blank and a subsequent thermal annealing treatment.

A third stage comprises the following steps:
(a) deep leaching of the blank to eliminate the soft phase and the impurities which it contains, leaving the doping agent emanating from the soft phase as leaching residue to an extent which increases from the periphery to the core of the blank;
(b) surface leaching to reduce the concentration of doping agent at the periphery of the blank.

In a fourth stage, the blank is subjected to a thermal consolidating treatment to eliminate the pores resulting from elimination of the soft phase.

According to another aspect of the invention, the starting materials used in the first stage comprise in predetermined proportions:
base materials conventionally entering in the composition of glasses "separable" into two interconnected and continuous solid phases of different compositions, in particular oxides of boron, silicon and sodium and optionally potassium and being intended to produce the separation into two solid phases during the subsequent treatments. The molar proportions are for example:
from 35 to 70% of $SiO_2$;
from 17 to 43% of $B_2O_3$;
from 4 to 15% of $Na_2O$ (or a mixture of $Na_2O$ with $K_2O$).
complementary materials or "doping" agents comprising in particular at least one of the oxides of the following metals: germanium, titanium, phosphorus and aluminum. The molar proportions are for example as follows:
from 0 to 5% of $Al_2O_3$;
from 0 to 10% of $TiO_2$;
from 0 to 10% of $P_2O_5$;
from 0 to 15% of $GeO_2$.

The advantages of the invention include the reduction in cost price arising out of the use of starting materials of which the impurity content may be higher by a factor of about 1000 than that required in the final stage. In particular, it is not necessary to introduce a purified and expensive doping agent into the pores to produce the required radial variation in the refractive index.

Figure 2:
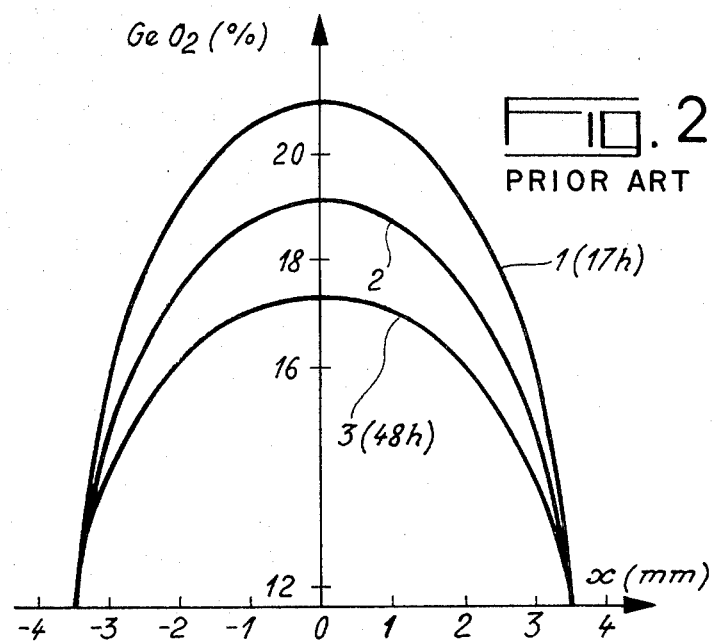
Figure 3:
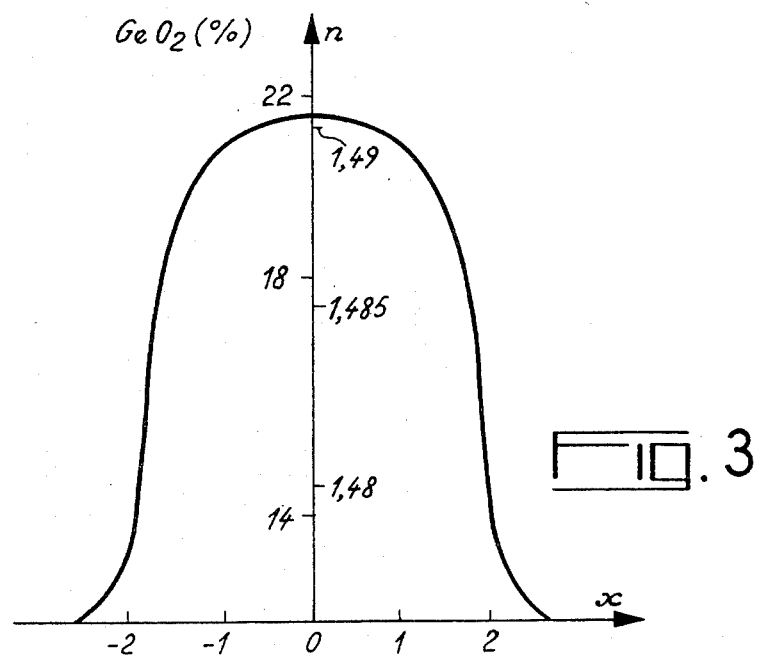

The invention will be better understood and other features thereof will become apparent from the following description in conjunction with the accompanying drawings, wherein:

FIG. 1 is a phase diagram;
FIG. 2 shows the radial variation in the concentration of doping agent in the porous glass obtained with three different deep-leaching times (third stage);
FIG. 3 is a diagram showing the radial variation in the concentration of doping agent in the consolidated glass after the peripheral leaching step. The refractive index of the consolidated glass (fourth stage) follows substantially the same relationship.

By way of example, the following oxides are used as starting materials in the following molar proportions (in %):
$SiO_2$(35 to 70%);
$GeO_2$(5 to 15%);
$B_2O_3$(17 to 42%);
$Na_2O$(4 to 15%).

The mixture of molten oxides behaves like a pseudobinary system of phases (liquid or solid):
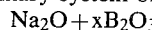
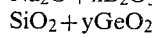
x and y being selected once and for all during preparation of the mixture.

FIG. 1 is one possible example of a phase diagram where the compositions are recorded as abscissae, as in a binary diagram, and the temperatures as ordinates. The following regions for example will be present:
region (A), where there is a single liquid phase,
region (B) and region (C) where there is a liquid phase and a solid phase of different compositions,
region (D) comprising one or two solid phases, depending on whether it falls beyond or within an immiscibility region (D.I.) which moreover may encroach on the adjacent regions.

The appearance of two separate interconnected solid phases is obtained in particular by proceeding as follows:
the starting point is a point M of the region (A), i.e. a molten bath of which the composition is given by the abscissa of the point M and its temperature by the ordinate of the point M;
this is followed by cooling along a segment MN, for example by quenching;
the temperature is increased again, passing through the segment NS, and then stabilized (thermal annealing). During this annealing treatment, two interconnected solid phases are formed; in other words two elements of the same phase communicate with one another and with the outside of the example (open network). It is also by virtue of this particular feature that one of the solid phases can be completely eliminated without difficulty. The invention utilizes the same particular feature and also the face that most of the impurities segregate in one of the phases which is subsequently eliminated, thus enabling a residual glass much purer than the initial glass to be obtained.

FIRST STAGE OF THE PROCESS

The first stage of the process is the melting of the mixture of oxides referred to above. It will be recalled that these oxides have typically to contain less than $10^{31}$ 4 of troublesome impurities essentially formed by certain so-called "transition" metals (iron, copper, nickel . . . ). The other impurities, such as water or organic products, may be present in a greater proportion.

Melting may be carried out by any conventional means providing no troublesome impurities are introduced. It is preferred to use a crucible of rhodium-containing platinum placed in a furnace capable of being heated to a temperature of 1400° C.

SECOND STAGE OF THE PROCESS

The second stage of the process comprises shaping of the blank and the thermal annealing treatment. The glass is shaped into elongated blanks, solid or hollow rods (radial dimensions on the order of 6 mm representing either the diameter of a solid blank or the thickness of a hollow blank) obtained for example by upward drawing from the molten glass contained in a crucible. A former in the shape of a solid or hollow rod enables a blank having the required shaped to be progressively withdrawn from the bath. The former is mounted at the end of a rod which facilitates traction through a cooling arrangement giving a thermal gradient with a high absolute value over a considerable temperature range (from 1000° C. to 450° C. for example).

In a variant of the shaping process, the blank may be drawn through a hole drilled in the base of the crucible (so-called die or extrusion process), a pressure being if necessary applied to the free surface of the bath.

For example, good results are obtained with the following parameters:
temperature of the glass in the crucible: 1000° C.;
thermal gradient in the cooler: 15° C. per mm;
drawing rate: 20 mm per minute;
composition of the glass in mole%:
 $SiO_2$: 57%
 $GeO_2$: 10%
 $B_2O_3$: 25%
 $Na_2O$: 8%

The drawing step is followed by a thermal annealing step described hereinafter:

This step is necessary because the phase separation texture obtained after the drawing step is too fine to enable the phase which has collected most of the impurities to be eliminated by selective leaching without breaking the blank. Accordingly, the object of the thermal annealing treatment is to coarsen this texture.

The thermal annealing treatment is carried out over a period of 1 to several hours at a temperature in the range from 500° C. to 600° C. It consists in a rearrangement of atoms to form two phases, namely a covalent phase, known as the hard phase, which is very rich in silica (typically on the order of 85%), and an ionic phase, known as the soft phase, which is poor in silica and rich in $Na_2O$ and $B_2O_3$. The doping element (one or several oxides) is distributed between the two phases. On the other hand, the transition metals are preferentially grouped in the soft phase.

THIRD STAGE OF THE PROCESS

The third stage of the process consists in leaching the blank to eliminate the impurities and to create an outer zone poor in doping agent and a central zone where the doping agent is distributed in accordance with a pseudo-parabolic law.

The stage comprises at least two steps (successive or simultaneous):

(A) DEEP LEACHING

The soft phase is etched by immersing the annealed and cooled glass in an acid solution selected in such a way that it does not react with the same kinetics with the various oxides forming the soft phase. For example, where $GeO_2$ is the sole doping element, it is possible to use a normal aqueous solution of HCl at 95° C. which rapidly attacks the oxides $B_2O_3$, $Na_2O$ (and optionally $K_2O$) and the transition metals, but which has virtually no effect on $SiO_2$ and only attacks $GeO_2$ progressively. There is thus obtained a purified porous glass in which the concentration of doping agent (left as leaching residue) increases gradually from the outer zone to the inner zone of the blank.

By varying the leaching time, therefore, it is possible for a more or less large quantity of doping agent to be left as leaching residue inside the pores. FIG. 2 illustrates typical examples which may be obtained with different deep leaching times. In addition to the leaching time and the type of acid used, the concentration of the solution in moles of acid and the temperature are also parameters which may be varied to leave a more or less large quantity of doping agent as leaching residue. The concentration of the acid may varied between 0.1 N and 5 N and the temperature between 70° C. and 100° C.

(B) SURFACE LEACHING

The radial profile characterizing the concentration of doping element may be controlled by immersing the porous (or partly porous) blank for a controlled period in a solvent of the doping agent so as to create in the blank an outer zone poor in the doping agent and, optionally, to modify the variation in the concentration of doping agent in the central zone and to bring it as close as possible to a pseudo-parabolic variation. Where $GeO_2$ is the doping agent, it is possible to use aqueous ammonia solutions having concentrations of from 0.1% to 10% by weight. Dilute sodium hydroxide (0.01 to 1% by weight) may also be used, but since it also attacks the hard phase, the surface of the consolidated blank should be polished to obtain fibres having a suitable mechanical resistance.

The third stage is capable of being modified in several ways:

First Variant

During step (b), the solubility of the doping agent in the peripheral region is increased by initially forming a complex which is subsequently dissolved in a suitable solvent. Where $GeO_2$ is the doping agent, it is possible for example to form thiodigermanic acid ($H_2Ge_2S_5$) by immersing the previously dried porous blank in alcohol containing hydrogen sulphide. The acid is then rinsed with water.

Second variant

In step (b), it is possible to promote leaching and the simultaneous dissolution of the doping agent by modifying the valency number or the co-ordination number of the doping ion. For example, hypophosphorous acid reduces the valency state of the germanium ion from 4 to 2 and thus renders this ion more soluble in hydrochloric acid which may be the leaching agent used in step (b).

Third variant

It is possible to interrupt the deep leaching to eliminate with a suitable solvent the doping element left as leaching residue in the porous outer zone of the blank. Leaching of the soft phase is then resumed and continued to completion.

Fourth variant

The leaching steps (a) and (b) may be carried out simultaneously using a first solution which leaves very little doping element as leaching residue and which is replaced before leaching is complete by a second solution which leaves the doping element substantially intact, the two solutions differing in at least one of the following parameters: nature, concentration or temperature of the solution.

Fifth variant

Step (a) may be carried out in the liquid phase, as described above, whilst the surface leaching step (b) is carried out by reaction in the gas phase. The porous glass is exposed to the action of hot vaporous chlorides (for example carbon tetrachloride at 500° C.). The gaseous reactants act by diffusing into the rod.

FOURTH STAGE OF THE PROCESS

The fourth stage of the process consists in consolidating the porous blank to remove the pores created by elimination of the soft phase.

The porous blank is carefully rinsed with deionized water. It is then dried, for example by placing it in a tube of silica through which a dry gas stream is passed or in which a vacuum is established. For drying, the blank is progressively heated to a temperature of from 500° to 750° C. and is kept at that temperature for several hours to several days.

The blank is then consolidated by progressively increasing the temperature to a level, typically in the range from 750° to 1200° C., sufficient to cause the pores to collapse. Consolidation may also be obtained displacing a furnace of minimal length along the blank (in this case the temperature of the furnace is also in the range from 750° to 1200° C.). Some of the impurities remaining in the hard phase may exist in several valency states. Depending on the nature of these impurities, it may be desirable to modify their degree of oxidation. For example, the ferrous ion $Fe^{++}$, which has an absorption maximum for wavelengths on the order of 11000 angstroms is particularly troublesome for optical fibres, whereas the ferric ion $Fe^{+++}$ absorbs very little light for wavelengths greater than 6000 Å.

By virtue of the large surface to weight ratio (on the order of 100 m$^2$/gram) of the porous skeleton, it is easy to modify the degree of oxidation of the residual impurities by controlling the atmosphere of the furnace during consolidation in order to reduce the absorption of the purified glass.

The fibre is directly drawn from the blank and the product obtained retains both the purity and the radial chemical composition gradient and, hence, the refractive index gradient of the blank.

By way of variation, the process may also be applied to tubular blanks. The advantage of a tubular blank is that it enables a greater mass of glass to be deep leached for the same length of blank, the thickness of the glass between the inner and outer walls being of the same order as the diameter of a solid blank (typically 4 to 8 mm). It is thus possible to increase the length of fibre produced from one and the same blank, for example to approximately 10 kilometers.

In the case of this variant (tubular blank), the first, second and fourth stages of the process are unchanged. By contrast, in the third stage, step (a) may be carried out by simultaneously leaching the inner and outer surfaces of the blank, whilst step (b) should be carried out by leaching only the outer surface. After the fourth stage, the tube may be closed by collapsing the inner wall by heating the blank with a torch on a glass lathe. The fibre obtained by drawing from the preform has a central zone where the concentration of doping agent (and hence the refractive index) decreases, although this "index dip" does not prevent fibres having a wide pass band of greater than 300 MHz for 1 km from being obtained.

In a variant of the process, it is possible on completion of the fourth stage to introduce the consolidated rod into a tube rich in silica (typically 90%) of which the internal diameter has been adjusted to the diameter of the rod. The rod/tube assembly is then drawn to obtain an optical fibre which has a core of purified glass and a peripheral cladding richer in silica. Since it does not have a light-guiding function, the peripheral cladding of the fibre may be made of a far less pure, highly light-absorbing glass. The advantage of this variant is that it enables a greater length of optical fibre to be produced for the same length of purified rod.

A few process examples are described in the following:

EXAMPLE 1

A glass containing (in mole %) 57% of $SiO_2$, 10% of $GeO_2$, 25% of $B_2O_3$ and 8% of $Na_2O$ is formed from starting materials containing less than $10^{-4}$ of transition metals. The glass is then drawn into a solid rod 6.5 mm in diameter. The rod (or blank) is annealed in air for 3 hours at 550° C. The cooled blank is then immersed for 24 hours in a 3 N solution of hydrochloric acid at 95° C. to deep-leach the soft phase. The porous rod is then rinsed with deionized water and subsequently immersed for 1 hour in a 1 N ammonia solution at 50° C. to reduce the concentration of doping agent at the periphery. The rod is then carefully rinsed with deionized water and dried by keeping it in a stream of dry nitrogen at a temperature increased progressively from ambient temperature to 680° C. at a rate of 15° C. per hour. The rod is kept at that temperature for 6 hours, after which the nitrogen is replaced by oxygen and the temperature of the blank is increased to 880° C. at a rate of 15° C. per hour to obtain consolidation. The preform obtained is then drawn at 1450° C. to produce a fibre 150 μm in diameter. The core of the fibre has a diameter of 120 μm and the difference in index between the axis and the surface amounts to 0.012.

EXAMPLE 2

The procedure is as described in Example 1 up to the annealing step. The annealed and cooled blank is then immersed for 2 hours in a 0.6 N solution of hydrochloric acid at 95° C. After rinsing for 1 hour with deionized water, the rod is immersed for 24 hours in a normal solution of ammonia at 22° C. After rinsing for 1 hour, the rod is reimmersed for 24 hours in a 3 N solution of hydrochloric acid at 95° C. The rod is then rinsed very carefully with deionized water and subsequently dried, consolidated and drawn into fibres as in Example 1. The fibre obtained has an index difference of 0.015 between the axis and the surface.

EXAMPLE 3

The procedure is as in Example 1 up to the annealing step. The annealed and cooled blank is then immersed for 1 hour in an aqueous solution heated to 95° C. and containing 1 mole per liter of hydrochloric acid and 1 more per liter of hypophosphorous acid. The rod is then rinsed for 1 hour and subsequently re-immersed for 24 hours in a 3 N solution of hydrochloric acid at 95° C. The rod is then rinsed very carefully with deionized water and subsequently dried, consolidated and drawn into fibres as in Example 1.

EXAMPLE 4

A glass containing (in mole%) 57% of $SiO_2$, 3.5% of $Al_2O_3$, 6.5% of $P_2O_5$, 25% of $B_2O_3$ and 8% of $Na_2O$ is produced from starting materials containing less than $10^{-4}$ of transition metals. The glass is then drawn into a solid rod 6.5 mm in diameter. The rod is annealed in air for 2 hours at 550° C. The cooled blank is immersed for 30 hours in a normal solution of hydrochloric acid at 95° C. and then carefully rinsed. The rod is then dried by keeping it in a stream of dry nitrogen at a temperature increased from 22° C. to 500° C. at a rate of 15° C. per hour. The rod is then purged for 2 hours with 100 cc/minute of nitrogen saturated with CCl$_4$ at a temperature of 500° C. Purging with nitrogen alone is then resumed for 10 hours, after which the nitrogen is replaced by oxygen and the temperature increased to 900° C. at a rate of 15° C. per hour to obtain consolidation. The preform obtained is drawn at 1500° C. to produce a fibre 150 μm in diameter. The diameter of the core is 100 μm and the difference in index between the axis and the outer surface amounts to 0.015.

FIGS. 2 and 3 show the results obtained respectively after step (a) of the third stage and after the fourth stage in the case of Example 1 above.

The radial distances in millimeters are recorded as abscissae along an axis Ox (O being the centre of the blank), being accompanied by the symbol + or −, depending on whether they are to the right or to the left of the centre O. The concentration of GeO$_2$ is recorded on the ordinate, exceeding the 10% of the initial composition at the centre by virtue of the elimination of the soft phase very rich in Na$_3$O and in B$_2$O$_3$.

In FIG. 2, the result obtained after step (a) of the third stage corresponds to three pseudo-parabolic curves of which the peaks are increasingly lower with the following times for the deep leaching step (step a) carried out with 3 N hydrochloric acid at 95° C.

Curve 1: 17 hours
Curve 2: 30 hours
Curve 3: 48 hours.

FIG. 3 shows the curvature after the fourth stage in the case of a blank which has been subjected to the treatment represented by curve 1 (17 h) in FIG. 2.

It can be seen that the refractive index decreases to a greater extent in FIG. 3 than in curve 1 of FIG. 2 when the radial distance increases, but that on the other hand the curve flattens at the periphery of the rod as a result of leaching in step (b).

What we claim is:

1. A process for the production of optical fibres consisting of a core with a graded refractive index and an optical cladding, comprising the preliminary formation of a blank having a unitary structure of a core with a graded refractive index with an optical cladding and larger in diameter than the fibre, comprising:
   a first stage consisting in preparing a bath of molten glass from starting materials capable of entering into a glass composition showing the phenomenon of separation into two solid interconnected and continuous phases of different composition; said starting materials having an impurity content of less than 10$^{-4}$, calculated taking into account molar proportions of oxides of transition metals; wherein the starting materials comprise, in predetermined proportions, base materials comprising at least oxides of silicon, boron, sodium and doping agents comprising at least one oxide selected from the group of germanium, titanium, phosphorous and aluminum oxides;
   a second stage comprising a first step of drawing a blank from the glass bath and a second step comprising at least one thermal annealing treatment which results in the appearance of the two solid interconnected and continuous phases of different composition, namely a hard phase rich in silica and a soft phase poor in silica, the soft phase having collected most of the impurities of the initial bath;
   a third stage comprising the following steps:
   (a) deep leaching of the blank to eliminate the soft phase and the impurities which it contains, leaving the doping agent emanating from the soft phase as leaching residue to an extent which increases from the periphery to the core of the blank;
   (b) surface leaching to reduce the concentration of doping agent at the periphery of the blank, thereby forming a unitary optical cladding;
   a fourth stage comprising a heat treatment in a controlled atmosphere for consolidating the blank.

2. A process as claimed in claim 1, wherein the starting materials used in the first stage comprise, in predetermined proportions, base materials comprising at least oxides of silicon, boron, potassium and sodium and complementary materials (or doping agents) comprising at least one oxide selected from the group of germanium, titanium, phosphorus and aluminium oxides.

3. A process as claimed in claim 1, wherein the base materials are mixed in the following proportions:
   from 35 to 70% of SiO$_2$;
   from 17 to 42% of B$_2$O$_3$;
   from 4 to 15% of Na$_2$O.

4. A process as claimed in claim 1, wherein the complementary materials are mixed in the following molar proportions, based on the total of starting materials in moles:
   from 0 to 5% of Al$_2$O$_3$;
   from 0 to 10% of TiO$_2$;
   from 0 to 10% of P$_2$O$_5$;
   from 0 to 15% of GeO$_2$.

5. A process as claimed in claim 1, wherein the starting materials mixed during the first stage correspond to a glass composition defined by the following molar percentages:
   57% of SiO$_2$;
   25% of B$_2$O$_3$;
   8% of Na$_2$O;
   10% of GeO$_2$.

6. A process as claimed in claim 1, wherein the solutions used for the deep leaching and surface leaching steps in the third stage are acid solutions having normalities of from 0.1 N and 5 N and temperatures in the range from 70° to 100° C.

7. A process as claimed in claim 1, wherein the deep leaching step of the third stage is carried out with an ammonia solution having a concentration of from 0.1% to 10% by weight.

8. A process as claimed in claim 1, wherein the deep leaching step of the third stage is carried out with a sodium hydroxide solution having a concentration of from 0.01 to 1% by weight.

9. A process as claimed in claim 1, wherein in the third stage, the surface leaching step (b) is carried out by forming a complex from the doping agent to be eliminated and subsequently eliminating the complex thus formed by a solvent.

10. A process as claimed in claim 9, wherein the doping agent being germanium oxide, the complex is thiodigermanic acid formed by immersing the porous glass in alcohol containing hydrogen sulphide.

11. A process as claimed in claim 1, wherein, in the third stage, the leaching agents act in the presence of hypophosphorous acid, the doping agent being germanium oxide.

12. A process as claimed in claim 1, wherein in the third stage, step (b) is carried out with a gaseous etching agent.

13. A process as claimed in claim 12, wherein the etching agent is a chloride vapour.

14. A process as claimed in claim 13, wherein the chloride is carbon tetrachloride at 500° C.

15. A process as claimed in claim 1, wherein the thermal consolidating treatment is carried out over a period of from 1 to several hours at a temperature in the range from 700° C. to 1200° C.

16. A process as claimed in claim 1, wherein the fourth stage additionally comprises a heat treatment in a controlled atmosphere before the consolidating treatment.

17. A process as claimed in claim 1, wherein the blank which is tubular is treated with a flame after the consolidating treatment for conversion into a solid blank.

18. A process as claimed in claim 1, wherein glass fibres are directly obtained by drawing from said consolidated blank.

19. A process as claimed in claim 1, wherein glass fibres are obtained by drawing from the consolidated blank placed beforehand in a tube of glass rich in silica (on the order of 90%) of which the internal diameter is adjusted to the diameter of said blank.

* * * * *

UNITED STATES PATENT AND TRADEMARK OFFICE
CERTIFICATE OF CORRECTION

PATENT NO. : 4,249,924

DATED : February 10, 1981

INVENTOR(S) : ARNAUD de PANAFIEU ET AL

It is certified that error appears in the above—identified patent and that said Letters Patent is hereby corrected as shown below:

Column 4, line 45: delete "$10^{31}$" and insert --$10^{-4}$--.

Column 4, line 46: delete "4".

Column 9, line 22: delete "$Na_3O$" and insert --$Na_2O$--.

*Signed and Sealed this*

*Twenty-second* Day of *December 1981*

[SEAL]

*Attest:*

*Attesting Officer*

GERALD J. MOSSINGHOFF

*Commissioner of Patents and Trademarks*